(12) United States Patent
Stark

(10) Patent No.: US 6,402,000 B1
(45) Date of Patent: Jun. 11, 2002

(54) ADJUSTABLE TOTE BAG DEVICE

(76) Inventor: Kathleen Stark, 705 Churchill St., Eau Claire, WI (US) 54703

( * ) Notice: Subject to any disclaimer, the term of this patent is extended or adjusted under 35 U.S.C. 154(b) by 10 days.

(21) Appl. No.: 09/729,365

(22) Filed: Dec. 5, 2000

(51) Int. Cl.$^7$ ................................................ B60R 7/00
(52) U.S. Cl. ..................... 224/572; 224/563; 383/22; D12/422
(58) Field of Search ................... 224/275, 572, 224/539, 543, 563, 155; 383/22; 297/188.01, 188.06, 188.12, 188.2; D12/415, 416, 422

(56) References Cited

U.S. PATENT DOCUMENTS

| | | | |
|---|---|---|---|
| 2,384,285 A | * | 9/1945 | Deutsch |
| 3,014,759 A | | 12/1961 | Bing |
| 3,479,085 A | | 11/1969 | Weinstein |
| 4,650,103 A | | 3/1987 | Mitchell |
| 4,799,731 A | * | 1/1989 | Brown |
| 4,974,760 A | * | 12/1990 | Miller |
| 5,326,175 A | * | 7/1994 | Carter |
| 5,354,119 A | | 10/1994 | Nicholas |
| D358,731 S | | 5/1995 | McAlear |
| 5,465,884 A | * | 11/1995 | Bohl et al. |
| D369,498 S | | 5/1996 | Newcomb |
| 5,573,288 A | * | 11/1996 | Raffensperger |
| 5,816,463 A | * | 10/1998 | Echeverri |
| 6,079,599 A | * | 6/2000 | Nordstrom et al. |
| 6,341,894 B1 | * | 1/2002 | Quinones ..................... 383/22 |

FOREIGN PATENT DOCUMENTS

NL    7311872   *  3/1975   ................. 224/275

* cited by examiner

Primary Examiner—Gregory M. Vidovich
(74) Attorney, Agent, or Firm—Tipton L. Randall

(57) ABSTRACT

The invention is an adjustable anchoring tote bag assembly for attachment to a half-height partition in a bus. The assembly includes a bag member fastened to an elongated planar flexible anchoring member having a length sufficient for encircling the partition and producing an overlapping section. A first fastening assembly secures the anchoring member overlapping section together. A second fastening assembly further secures the overlapping section together. A third fastening assembly secures the anchoring member to the partition. A fourth fastening assembly between the bag member open top end and the anchoring member holds the bag member top end closed. The tote bag assembly is used to secure articles in a school bus to prevent injury should a vehicle accident occur.

20 Claims, 3 Drawing Sheets

ADJUSTABLE TOTE BAG DEVICE

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

FIELD OF THE INVENTION

The invention relates to a tote bag for fastening to a panel and, more particularly, to an adjustable tote bag for fastening to a panel of public transportation vehicles.

BACKGROUND OF THE INVENTION

With the main streaming of most handicapped children in the public school system, the buses used to transport all students must be provided with features to enable transport of students in wheel chairs or other movement aids, such as crutches or walkers. In most cases, the school bus is modified to include an open floor area where one or more wheel chairs, with the student therein, can be secured to the floor during transport. The open floor area is separated from the regular bus seats by one or more half-height partitions fastened to the floor and optionally to the bus ceiling.

The wheel chairs for handicapped students are often equipped with various auxiliary devices, such as trays and the like, for ease of operation and user comfort. In particular, trays are removable from the wheel chair to allow the user entry and exit. These removable devices are potential projectiles should the bus be involved in an accident. Thus, there is needed some way of securely storing trays and similar auxiliary device while the bus is traveling to pick up and deliver students to school or return students from school to their homes.

Numerous patents have issued for devices fastening to vehicle seats and the like. Some examples of such inventions for which patents have issued include the following.

Bing, in U.S. Pat. No. 3,014,759, describes an automobile utility bag formed of a single piece of flexible sheet material folded to define a pocket much longer than deep. The piece of material extends upwardly from the pocket to proved a panel for overlaying areas of automobile seats to attach the bag thereto. The bag also includes a stiff board insert within the pocket to divide the pocket into two compartments. The device includes attached straps for anchoring the bag in place on a seat.

In U.S. Pat. No. 3,479,085, Weinstein discloses a universal slip cover type of article carrier, for mounting and demounting on the back of an automobile seat, formed of a first flexible panel of rectangular configuration with opposite sides and opposite ends and which is folded over on itself so as to provide a front and a back. An elastic side panel is sewn to each pair of adjacent edges of the front and back with the elastic side panels terminating short of the fold for leaving open spaces at the fold to permit the slip cover to snugly fit various comer configurations of automobile seat backs. Several panels are sewn across the back of the slip cover to form pockets for storing items.

Mitchell, in U.S. Pat. No. 4,650,103, discloses a public transportation vehicle seat slip cover having a plurality of transparent plastic pockets arrayed in partially overlapping rows for displaying advertising brochures and the like.

Nicholas, in U.S. Pat. No. 5,354,119, describes a sleeve having elastic bans at the open ends. The sleeve is place over a back of a seat or chair and holds articles within the sleeve against the back of the seat or chair.

In U.S. Pat. No. Des. 358,731, McAlear shows a sack for hanging on the back of a chair, while Newcomb, in U.S. Pat. No. Des. 369,490 shows a pocket organizer for use with a beach chair.

Thus, there is an unmet need for a device that securely holds items in a public transportation vehicle to prevent dangerous movement of the items in case of an accident.

SUMMARY OF THE INVENTION

The invention is an adjustable anchoring tote bag assembly for attachment to a half-height partition in a bus. The assembly includes an elongated planar flexible anchoring member with front and back surfaces having a width less than that of the partition, and a length sufficient for encircling the partition and producing an overlapping section of the anchoring member. A first fastening means secures the anchoring member overlapping section together. A second fastening means further secures the overlapping section, with the second fastening means attached to the anchoring member front surface for connecting two front surface points, one point on each side of the overlapping section. A third fastening means secures the anchoring member to the partition, with the third fastening means attached to the anchoring member front surface for connecting two front surface points, one point on each side of the partition. A bag member with an open top end and a closed bottom end is secured to the anchoring member front surface with the bag member closed bottom end adjacent the anchoring member overlapping section. A fourth fastening means between the bag member open top end and the anchoring member front surface holds the bag member top end closed.

DESCRIPTION OF THE PREFERRED EMBODIMENTS

Nomenclature

Figure 1:
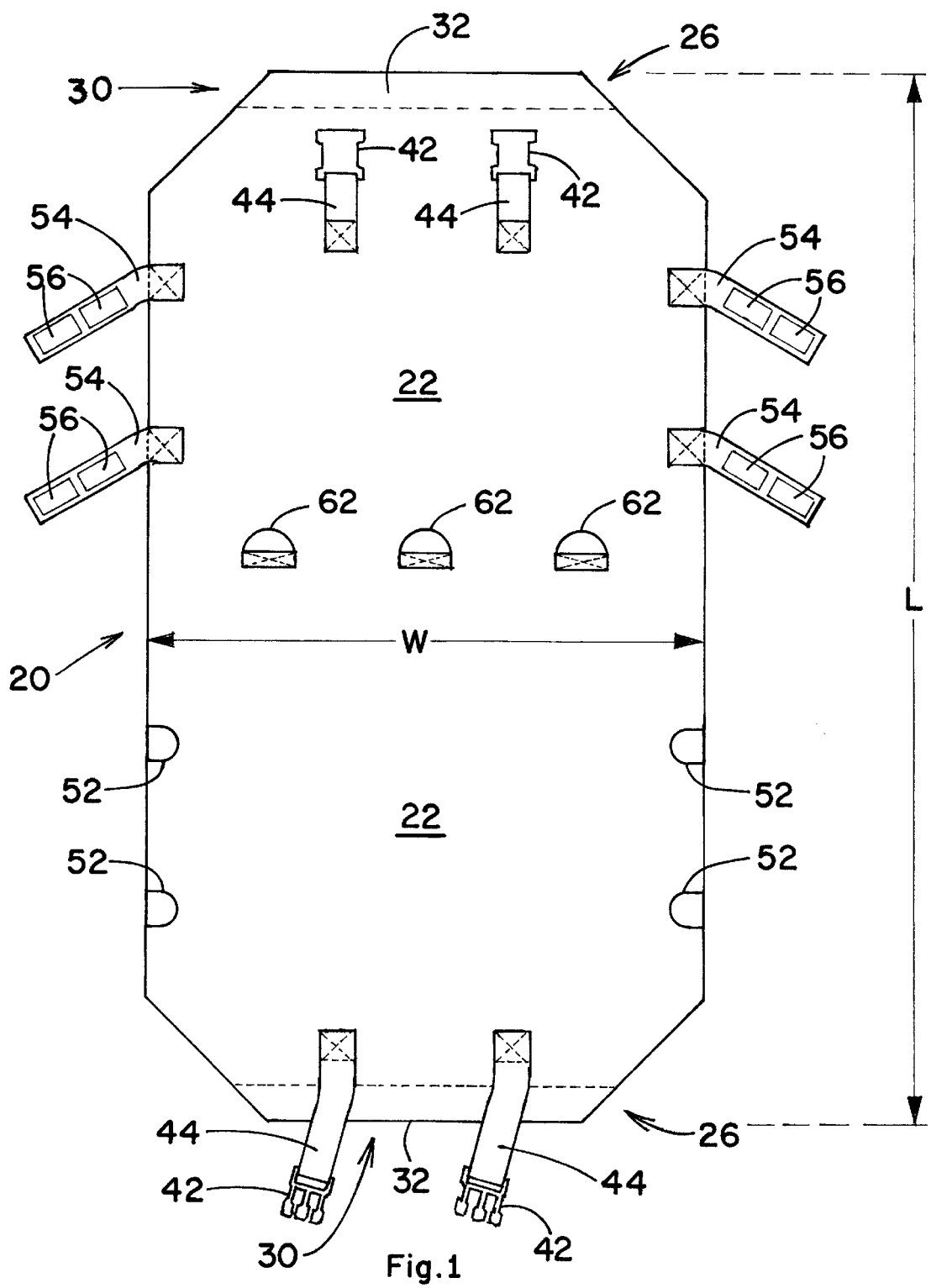
FIG. 1 is a perspective view of the planar anchoring member of the present invention.
Figure 2:
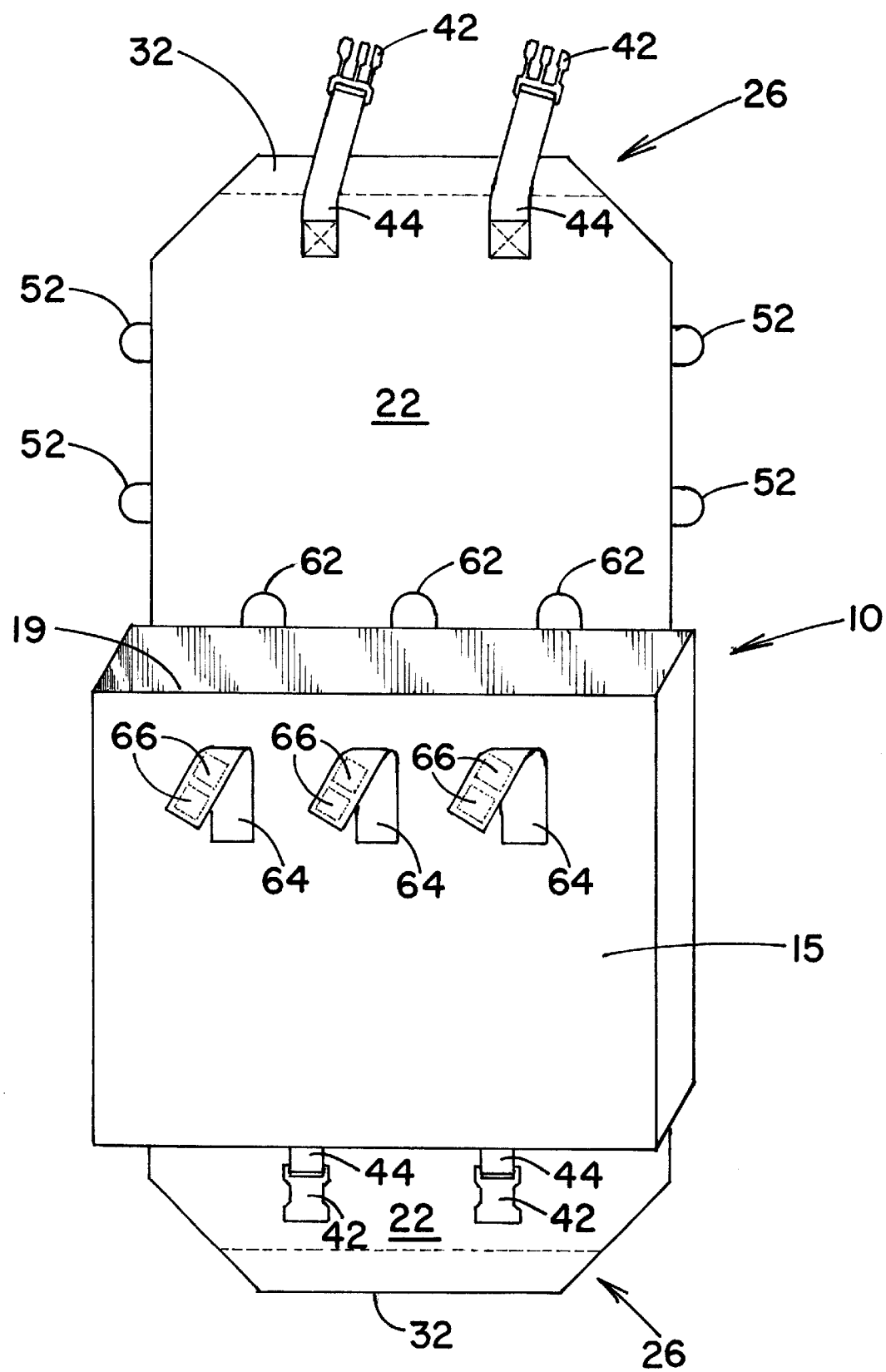
FIG. 2 is a perspective elevational view of the anchoring tote bag assembly of the present invention.

Anchoring Tote Bag Assembly
Bag Member
Closed Bottom End of Bag Member
Open Top End of Bag Member
Planar Flexible Anchoring Member
Front Surface of Anchoring Member
Back Surface of Anchoring Member
Overlapping Section of Anchoring Member
First Fastening Means
Hook and Loop Tape Fastener
Second Fastening Means
Snap Clip Member Strap Member
Third Fastening Means
D-Ring Member
Strap Member
Hook and Loop Tape Fastener
Third Fastening Means
D-Ring Member
Strap Member
Hook and Loop Tape Fastener Construction Referring to Figures, the adjustable anchoring tote bag assembly 10 of the present invention is shown. The assembly 10 includes a bag member 15 having a closed bottom end 17 and an open top end 19 The bag member 15 is secured to an elongated planar flexible anchoring member 20 that is used to fasten the assembly 10 to a half-height partition P in a school bus or similar transportation vehicle. The anchoring member 20 has a front surface 22 and a back surface 24 with the bag member 15 secure to the front surface 22. Both the bag member 15 and the anchoring member 20 are preferably made of canvas material for strength and durability. Canvas construction allows the bag member 15 to be stitched to the anchoring member 20 for secure fastening thereto.

The anchoring member 20 has a width less than that of the partition P to which the assembly 10 is secured, and a length sufficient for encircling the partition P to produce an overlapping section 26 of the anchoring member 20. A first fastening means 30 secures the anchoring member overlapping section 26 together. Preferably, the first fastening means 30 is hook and loop tape fastener 32, commonly called Velcro fastener, with a length of hook tape secured to one surface and a length of loop tape secured to the other surface of the overlapping section 26. The hook and loop tape fastener 32 preferably extend nearly the full width of the anchoring member 20. The bag member 15 is preferably secured to the anchor member 20 with the bag closed bottom end 17 adjacent the overlapping section 26. Also, it is most preferable that one length of hook and loop tape fastener 32 be secured to the back surface 24 of the anchoring member overlapping section 26 adjacent the bag closed bottom end 17 and the other length of hook and loop tape fastener 32 be secured to the front surface 22 of the anchoring member overlapping section 26 opposite the bag closed bottom end 17.

Figure 3:
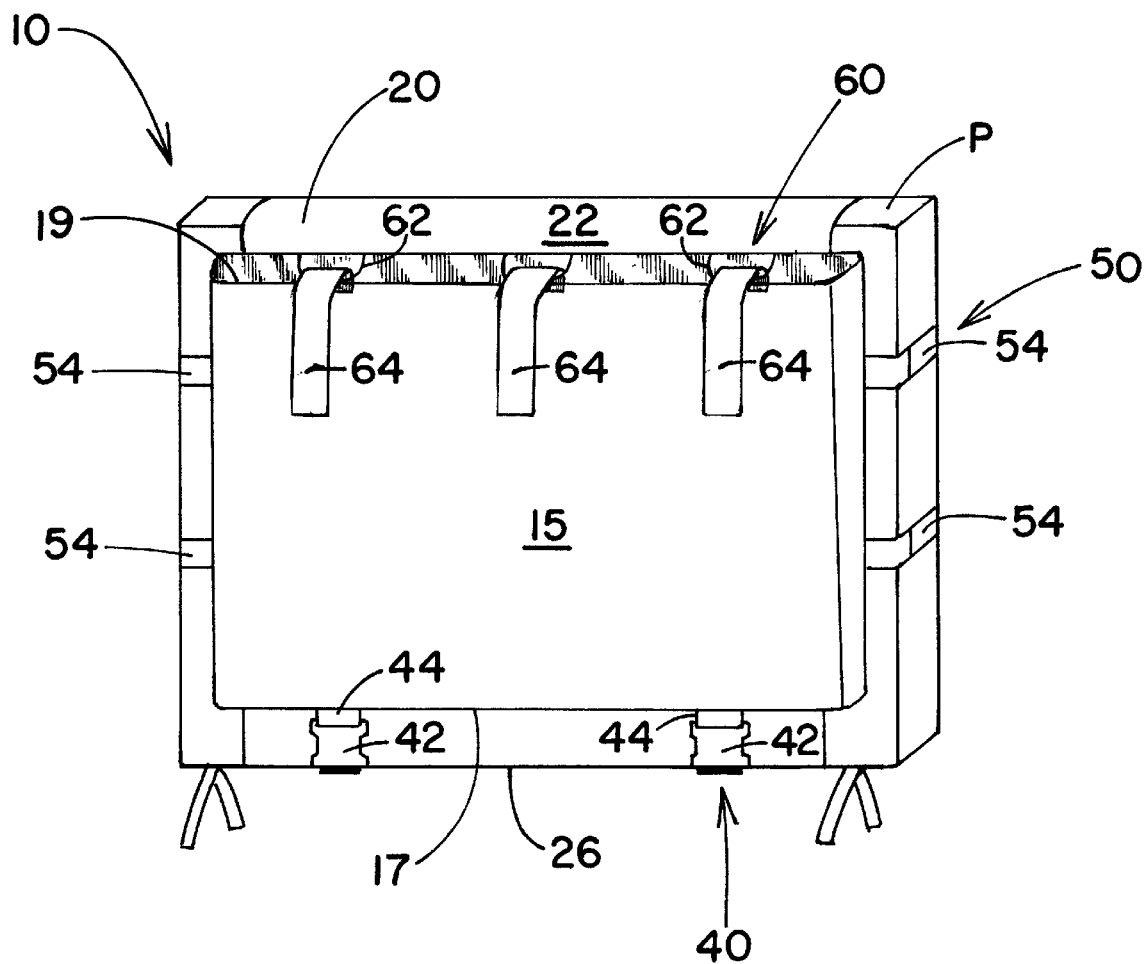
FIG. 3 is a perspective elevational view of the anchoring tote bag assembly secured to a partition.

As indicated above and referring to FIG. 3, the anchoring member 20 is positioned encircling the partition P with the bag member 15 located on the side of the partition toward the open space where a wheel chair is located. The overlapping section 26 of the anchoring member 20 is positioned at the bottom of the partition P with the overlapping portion adjacent the bag closed bottom end 17 on top of the overlapping portion opposite the bag closed bottom end 17. This configuration prevents separating the overlapping section 26 from the side of the partition opposite the bag member 15.

A second fastening means 40 for further securing the overlapping section 26 of the anchor member 20 is also present. The second fastening means 40 is attached to the anchor member front surface 22 and connects two points thereon, one point on each side of the overlapping section 26, with the second fastening means 40 traversing the overlapping section 26. The second fastening means 40 is preferably a two-part snap clip fastener member 42 each part of which is secured by strap members 44 between two front surface 22 points. The snap clip member 42 is opened for installing the anchoring member around the partition P.

Once the hook and loop tape fastener 30 secures the overlapping section 26, the separated parts of snap clip member 42 are connected over the overlapping section 26 to further secure the overlapping section 26. Preferably, a pair of spaced apart second fastener means 40 are employed as shown in FIGS. 1—to secure the overlapping sections 26.

A third fastening means 50 is employed to secure the tote bag assembly 10 to the partition P to prevent rotation of the encircling anchoring member 20 once it is on the partition P. To prevent the anchoring member 20 from rotating on the partition P, a third fastening means 50 is attached to the anchoring member front surface 22 for connecting two front surface points, one point on each side of the partition P. The third fastening means 50 is preferably a D-ring member 52 secured to one front surface point, and a strap member 54 secured to another front surface point, the strap member 54 having complementary lengths of hook and loop fastener tape 56 thereon. With the anchoring member 20 encircling the partition P, the strap member 54 loops through the D-ring member 52 and attaches the strap member 54 upon itself by the two tape sections. Complementary lengths of tape are defined as one length having loop features and the other length having hook features. Preferably the D-ring member 52 is fastened to the anchoring member front surface 22 at a point opposite the bag member 15 and the strap member 54 is fastened to the anchoring member front surface 22 at a point adjacent the bag member 15. Thus, with the anchoring member 20 having a width less than that of the partition P, the hook and loop attached strap member 54 is on the side of the partition where the bag member 15 is positioned. Preferably, there are two pairs of third anchoring means 50, one spaced apart pair encircling each end of the partition P to hold the tote bag assembly 10 in position. Since the anchoring member 20 is of a width less than the partition P, the third fastening means 50 allows adjustment of the assembly 10 to accommodate a variety of partition widths.

The tote bag assembly 10 further includes a fourth fastening means 60 positioned between the bag member open top end 19 and the anchoring member front surface 22 for holding the bag member top end 19 closed. The fourth fastening means 60 is preferably a D-ring member 62 secured to one front surface point, and a strap member 64 secured to the bag member open top end 19, the strap member 64 having two complementary lengths of hook and loop fastener tape 66 thereon. The strap member 64 loops through the D-ring member 62 and attaches the strap member 64 upon itself. Preferably, there are at least two fourth fastening means 60 present to hold the open top end 19 of the bag member 15 in a closed orientation. The bag member 15 preferably has a width exceeding the width of the anchoring member 20 in order to accommodate both large and small articles that require containment during movement of the bus.

The adjustable tote bag assembly 10 thus provides many useful features. The anchoring member 20, having a width less than that of the partition and having adjustable third fastening means, allows the adjustable tote bag assembly 10 to accommodate a variety of partition sizes, as well as partitions mounted between poles that extend from the floor to the ceiling of the vehicle. The particular orientation of the hook and loop strips 32 of the overlapping sections and the straps 54 and D-rings 52 of the third fastening means prevents tampering of these fasteners from the partition side opposite that of the bag member. The fasteners allow for removal of the adjustable tote bag assembly 10 for cleaning or transfer to another vehicle partition.

While the invention has been particularly shown and described with reference to a preferred embodiment thereof, it will be understood by those skilled in the art that various changes in form and details may be made therein without departing from the spirit and scope of the invention.

I claim:

1. An adjustable anchoring tote bag assembly for attachment to a half-height partition in a bus comprising;

an elongated planar flexible anchoring member with front and back surfaces having a width less than that of the partition, the anchoring member having a length sufficient for encircling the partition and producing an overlapping section of the anchoring member;

first fastening means for securing the anchoring member overlapping section together;

second fastening means for further securing the overlapping section, the second fastening means attached to the anchoring member front surface for connecting two front surface points, one point on each side of the overlapping section;

third fastening means for securing the anchoring member to the partition, the third fastening means attached to the anchoring member front surface for connecting two front surface points, one point on each side of the partition;

a bag member with an open top end and a closed bottom end, the bag member secured to the anchoring member front surface with the bag member closed bottom end adjacent the anchoring member overlapping section; and fourth fastening means between the bag member open top end and the anchoring member front surface for holding the bag member top end closed.

2. The tote bag assembly of claim 1 wherein, said first fastener means comprises hook and loop tape fastener secured to the anchoring member overlapping section.

3. The tote bag assembly of claim 2 wherein, a first part of the hook and loop tape fastener is secured to the back surface of the anchoring member overlapping section adjacent the bag member closed bottom end and a second part of the hook and loop tape fastener is secured to the front surface of the anchoring member overlapping section opposite the bag member closed bottom end.

4. The tote bag assembly of claim 1 wherein, said second fastening means for further securing the anchoring member overlapping section comprises a snap clip fastener secured by straps between two front surface points, one point on each side of and adjacent the overlapping section.

5. The tote bag assembly of claim 1 wherein, said third fastening means for securing the anchoring member to the partition comprises a D-ring member secured to one anchoring member front side point and a strap member secured to another anchoring member front side point, the strap member having complementary lengths of hook and loop fastener tape thereon for looping through said D-ring member and attaching upon itself.

6. The tote bag assembly of claim 5 wherein, the third fastener means D-ring member is secured to an anchoring member front side point opposite the bag member and the strap member is secured to an anchoring member front side point adjacent the bag member.

7. The tote bag assembly of claim 1 wherein, said fourth fastening means comprises a D-ring member secured to said anchoring member front side and a strap member secured to the bag member open top end, the strap member having complementary lengths of hook and loop fastener tape thereon for looping through said D-ring member and attaching upon itself.

8. The tote bag assembly of claim 1 wherein, said anchoring member and bag member are fabricated from canvas material.

9. The tote bag assembly of claim 1 wherein, said bag member has a width exceeding the width of the anchoring member.

10. An adjustable anchoring tote bag assembly for attachment to a half-height partition in a bus comprising;

an elongated planar flexible anchoring member with front and back surfaces having a width less than that of the partition, the anchoring member having a length sufficient for encircling the partition and producing an overlapping section of the anchoring member;

first fastening means of hook and loop tape fastener for securing the anchoring member overlapping section together;

second fastening means of a snap clip fastener for further securing the overlapping section, the second fastening means snap clip fastener attached by straps to the anchoring member front surface for connecting two front surface points, one point on each side of and adjacent the overlapping section;

third fastening means for securing the anchoring member to the partition, the third fastening means including a D-ring member attached at one point to the anchoring member front surface and a strap member secured to another anchoring member front surface point for connecting the two front surface points, one point on each side of the partition, the strap member having complementary lengths of hook and loop fastener tape thereon for looping through said D-ring member and attaching upon itself, a bag member with an open top end and a closed bottom end, the bag member secured to the anchoring member front surface with the bag member closed bottom end adjacent the anchoring member overlapping section; and fourth fastening means between the bag member open top end and the anchoring member front surface for holding the bag member top end closed.

11. The tote bag assembly of claim 10 wherein, a first part of the hook and loop tape fastener of the first fastening means is secured to the back surface of the anchoring member overlapping section adjacent the bag member closed bottom end and a second part of the hook and loop tape fastener is secured to the front surface of the anchoring member overlapping section opposite the bag member closed bottom end.

12. The tote bag assembly of claim 10 wherein, the hook and loop tape fastener of the first fastening means extends the width of the anchoring member overlapping section.

13. The tote bag assembly of claim 10 wherein, the third fastener means D-ring member is secured to an anchoring member front side point opposite the bag member and the strap member is secured to an anchoring member front side point adjacent the bag member.

14. The tote bag assembly of claim 10 wherein, said fourth fastening means comprises a D-ring member secured to said anchoring member front side and a strap member secured to the bag member open top end, the strap member having complementary lengths of hook and loop fastener tape thereon for looping through said D-ring member and attaching upon itself.

15. The tote bag assembly of claim 10 wherein, said anchoring member and bag member are fabricated from canvas material.

16. The tote bag assembly of claim 10 wherein, said bag member has a width exceeding the width of the anchoring member.

17. An adjustable anchoring tote bag assembly for attachment to a half-height partition in a bus comprising;

an elongated planar flexible anchoring member with front and back surfaces having a width less than that of the partition, the anchoring member having a length sufficient for encircling the partition and producing an overlapping section of the anchoring member;

first fastening means of hook and loop tape fastener for securing the anchoring member overlapping section together, a first part of the hook and loop tape fastener secured to the back surface of the anchoring member overlapping section adjacent the bag member closed bottom end and a second part of the hook and loop tape fastener secured to the front surface of the anchoring member overlapping section opposite the bag member closed bottom end;

second fastening means of a snap clip fastener for further securing the overlapping section, the second fastening means snap clip attached by straps to the anchoring member front surface for connecting two front surface points, one point on each side of and adjacent the overlapping section;

third fastening means for securing the anchoring member to the partition, the third fastening means including a D-ring member attached at one point to the anchoring member front surface and a strap member attached to another anchoring member front surface point for connecting the two front surface points, one point on each side of the partition, the strap member having complementary lengths of hook and loop fastener tape thereon for looping through said D-ring member and attaching upon itself, a bag member with open top end and closed bottom end, the bag member secured to the anchoring member front surface with the bag member closed bottom end adjacent the anchoring member overlapping section; and fourth fastening means between the bag member open top end and the anchoring member front surface, the fourth fastening means including a D-ring member secured to said anchoring member front side and a strap members secured to the bag member open top end, the strap member having complementary lengths of hook and loop fastener tape thereon for looping through said D-ring member and attaching upon itself for holding the bag member top end closed.

18. The tote bag assembly of claim 17 wherein, the hook and loop tape fastener of the first fastening means extends the width of the anchoring member overlapping section.

19. The tote bag assembly of claim 17 wherein, said anchoring member and bag member are fabricated from canvas material.

20. The tote bag assembly of claim 17 wherein, said bag member has a width exceeding the width of the anchoring member.

* * * * *